April 22, 1969  D. K. CAMPBELL, JR  3,439,654
POSITIVE DISPLACEMENT INTERNAL COMBUSTION ENGINE
Filed Oct. 10, 1967  Sheet 2 of 2

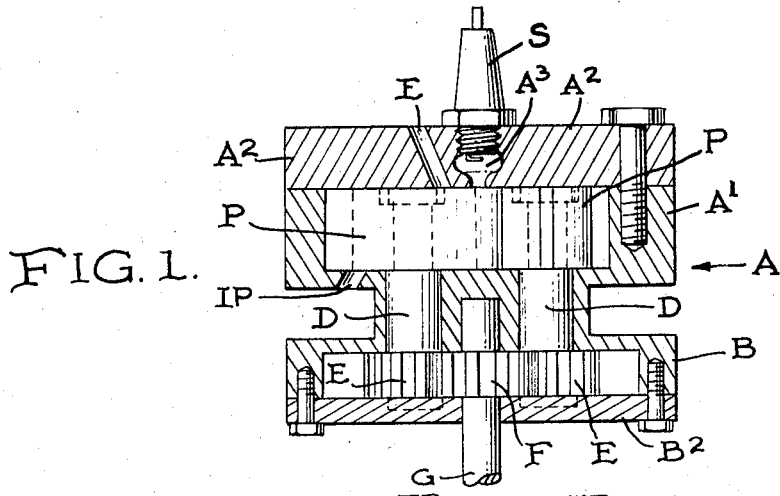
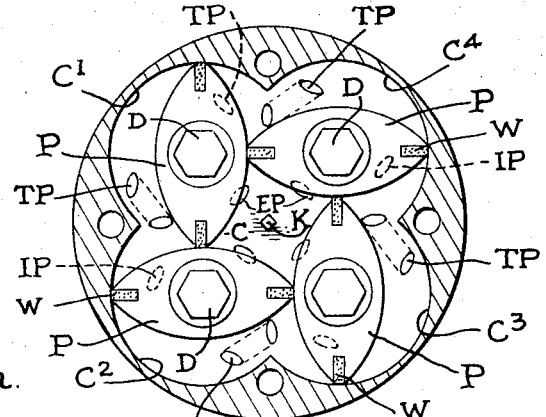
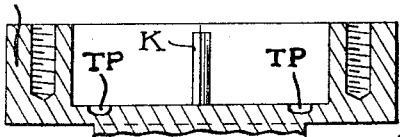
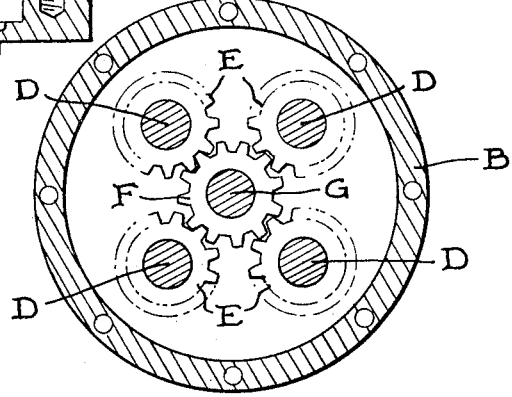

INVENTOR
DONALD K. CAMPBELL, JR.

BY Emory G. Groff Jr.
ATTORNEY

United States Patent Office 3,439,654
Patented Apr. 22, 1969

3,439,654
POSITIVE DISPLACEMENT INTERNAL
COMBUSTION ENGINE
Donald K. Campbell, Jr., 8721 SW. 191st St.,
Miami, Fla. 33157
Filed Oct. 10, 1967, Ser. No. 674,274
Int. Cl. F02b 55/00; F01c 1/08
U.S. Cl. 123—12           8 Claims

ABSTRACT OF THE DISCLOSURE

An internal combustion engine having a plurality of overlapping combustion chambers with elliptical cam pistons located in a common plane and adapted to be actuated by two firing strokes for each complete revolution of the pistons, to impart continuous rotation to a power take-off shaft.

---

This invention relates to internal combustion engines, and more particularly to a compact and simplified departure from prior engine practice due to a special arrangement of parts, for effectively and positively (a) controlling the intake of gaseous fuel; (b) causing it to ignite; (c) and then to exhaust the spent gas in a novel sequential manner through the use of a series of synchronized cam pistons which provide the primary source of power, while controlling the intake, compression and exhaust phases of the complete cycle in a rapid and practical manner.

One of the objects of the invention is to provide an internal combustion engine having a series of generally elliptical identical cam pistons which operate to not only form the combustion chamber, but also serve as valves to control the exhaust of the spent gases efficiently, without the substantial lost energy so frequently encountered in reciprocating piston-type motors which require a multiplicity of parts such as cam shafts, reciprocating valves, timing gear trains, and other accessories.

Another object is to provide an exceedingly compact and efficient engine capable of delivering its full driving power continuously and uniformly to a main output shaft.

A still further object of the present invention is to provide an internal combustion engine having two firing strokes for each revolution of each cam piston, thus insuring a substantially continuous uniform flow of power.

With these and other objects in view, which will more readily appear as the nature of the invention is better understood, the invention consists in the novel construction, combination and arrangement of parts hereinafter more fully described, illustrated and claimed.

A preferred and practical embodiment of the invention is shown in the accompanying drawing, in which:

FIGURE 1 is a vertical view, partly in section, of the complete motor showing cam pistons, shafts and gears, with the head and bottom gear case plates detachably fixed to the body;

FIGURE 2 is a bottom plan view of the motor shown in FIGURE 1 with the bottom case plate removed, illustrating the main power shaft gear connected with the gears for each of the elliptical pistons;

FIGURE 3 is a top plan view of the unit with the head removed, illustrating the cam pistons in their respective chambers and fitted to their respective drive shafts;

FIGURE 3a is a cross-sectional view on a reduced scale, showing the center peg to be engaged by the tips of the cam pistons;

Similar reference characters designate corresponding parts throughout the several figures of the drawings.

Figure 4:
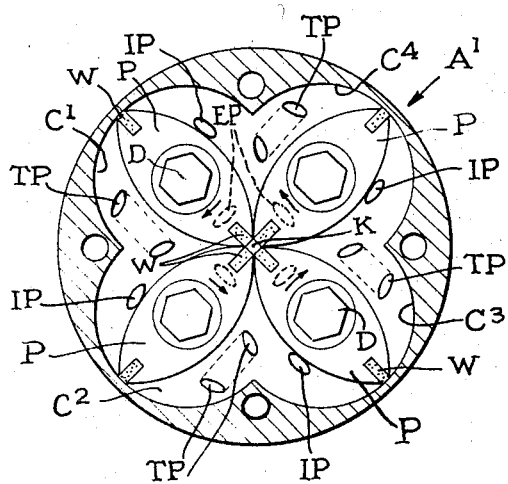
FIGURE 4 is a top plan view, illustrating the firing position of the cam pistons, the gases in the inner chamber being compressed ready to fire, with the outer chambers ready for the successive compression stroke.

Referring first to FIGURE 1, which is a vertical sectional view, it will be seen that the motor includes an annular spool-like engine block or case A having an upper power section A' and a lower gear section B. The power section is closed by a circular head plate $A^2$ and the gear section is closed by a circular bottom plate $B^2$. The head plate $A^2$ is provided centrally with a spark plug S, and a single exhaust port E. The tip of the spark plug S is disposed contiguous to a firing chamber $A^3$ formed in the head plate $A^2$, which chamber in turn communicates with the engine combustion chamber C in the center of the block A.

As will be seen from FIGURE 3a, which is a vertical cross section taken diametrically across the block A, the axis of the block is provided in the compression chamber area C with an upstanding peg K, of substantially square cross section so when the cams are rotated to the firing position the end seals thereof will wipe the lateral surfaces of the peg K. The top of the peg is disposed at a point spaced from the inner surface of the head $A^2$ and thus, at the time of firing, it will be understood that the combustion chamber C will comprise the space between the top of this peg and the bottom of the spark plug S above the firing chamber $A^3$.

In FIGURES 1 and 2, each elliptical cam piston P is fixedly mounted on a shaft D which extends through the case A, and is provided with a pinion gear E meshing with the drive gear F on the main power output shaft G, which may be connected with the apparatus to be powered. The power or output shaft G also synchronizes the four shafts with each other.

The head plate $A^2$ is provided with a single exhaust passage E which communicates with a plurality of exhaust ports EP which, as will presently appear, communicate with related combustion chamber C, formed twice during each complete revolution of the mating contours of the elliptical pistons P:

Referring to FIGURE 3, the power section A' is provided with a cluster of overlapping circular piston chambers C', $C^2$, $C^3$ and $C^4$. These chambers are formed by overlapping circles struck from axes equidistant from the center peg K. As noted, the outer walls of the chambers C', $C^2$, $C^3$ and $C^4$ describe an arc, the radius of which is substantially less than the radius of the walls of the pistons P. Furthermore, the outer portion of each said chamber comprises an arc formed by the case wall which is slightly greater than semi-circular whereby, when the pistons are in the position shown in FIGURE 6, each said chamber will be fully enclosed as the wiping seals W therein engage the nodes N in the case wall.

The case A is provided with a series of intake ports IP opening into the bottom of the power section A' whose arrangement and distribution may be better observed from the diagrammatic views of FIGURES 4–7.

Each of the chamber C', $C^2$, $C^3$ and $C^4$ is provided with one of the intake ports IP, the opening of which is disposed within the area of each chamber arc and outside the longitudinal line passing one node N to another node N. Also, as will be most clearly seen from FIGURE 4, each intake port opening is disposed in advance of the movement of the pistons, considering that the pistons all rotate in a clockwise direction as viewed in the top views of the drawings.

A series of four passageways, one for each piston P, is formed in the bottom wall of the power section A' beneath the pistons P. Each such passageway comprises a transfer port TP resembling a U-shaped passageway, both ends of which open into the bottom face of the power section wall. The function of these transfer ports TP will be obvious after considering the description of operation set forth hereinafter.

It will be apparent that the four pistons P will be fitted within the power section A' in a manner to provide an extremely close tolerance or gas-tight fit between the top and bottom surfaces of the pistons and the juxtaposed inner surfaces of the power section A' and the head plate $A^2$. Likewise, it will be understood that any suitable conventional means may be utilized to provide ignition timing, carburetion and disposition of exhaust gases from the exhaust passage E.

Figure 5:
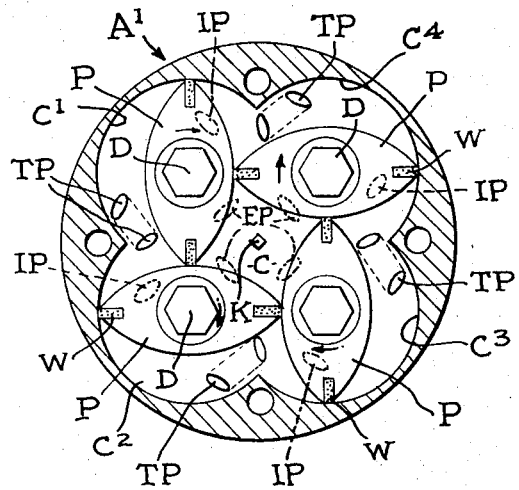
FIGURE 5 illustrates the position of the cam pistons, with the first firing stroke half completed, the exhaust ports being exposed, and with the outer chambers on compression stroke.

The operation of the present invention may be understood by following a description of the sequence of events as illustrated in FIGURES 4–7 inclusive. The pistons P are initially installed within the power section A' such that the major or longitudinal axes of each pair of diametrically opposed pistons are parallel, while the major axes of any two adjacent pistons will be disposed normal to one another. In the position shown in FIGURE 4 of the drawings, the engine is ready for firing whereby ignition of the spark plug S will cause combustion of a gaseous fuel mixture which will be under compression and disposed above the top of the center peg K which is beneath the firing chamber $A^3$. As expansion of the ignited gaseous fuel mixture takes place, it will be understood that the next succeeding gaseous fuel mixture has been introduced into each of the four chambers C', $C^2$, $C^3$ and $C^4$ by way of the intake ports IP, whereupon following combustion of the mixture within the combustion chamber C all of the pistons P will be driven in a clockwise direction toward the position as shown in FIGURE 5.

Figure 6:
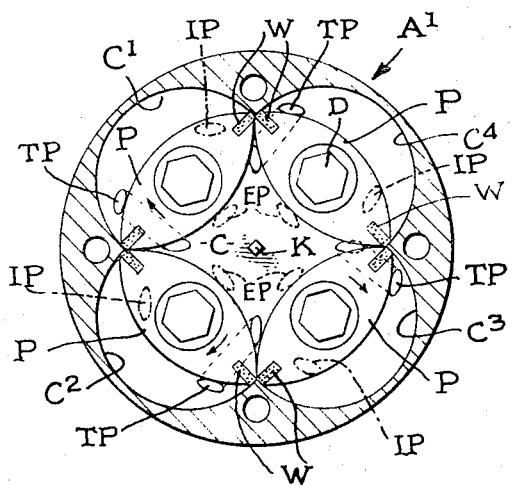
FIGURE 6 shows the position of the cam pistons with the first firing stroke fully completed, with the outer chambers communicating with the inner chamber through appropriate transfer channels.

Immediately following the previously referred to combustion, the leading arcuate edge of each piston will pass over its related intake port IP to close same, while at the same time, the ever-increasing area of the combustion chamber C formed by the rotating pistons causes all four of the exhaust ports EP to be simultaneously exposed to the combustion chamber to permit expulsion of the spent products of combustion from the interior of the power section A' to the atmosphere by way of the exhaust passage E. Quite obviously, the mere exposing of the exhaust ports to the combustion chamber would not cause complete expulsion of all of the spent products of combustion as some positive means are necessary in a two-stroke engine to produce scavenging of the combustion chamber prior to introduction of the next succeeding compression stroke. This is accomplished as the pistons rotate from the position of FIGURE 5 to the position shown in FIGURE 6, wherein it will be seen that when the pistons are positioned such that the wiping seals W engage the nodes N, one opening of each of the transfer ports TP will be disposed on either side of one end of each piston adjacent the wiping means W. The time interval during which both openings of each transfer port will be exposed as shown in FIGURE 6 is extremely minute, which will be readily realized when it is considered that the openings to the transfer ports TP are disposed adjacent the end of the piston P, which end is moving at an extremely high rate of speed. Another feature of construction which limits the time of this double exposure of the openings of each transfer port is the elongated configuration of these openings, whereby it will be seen that the major axis of these openings is substantially parallel to the adjacent edge of the piston. During the brief interval that both openings of each transfer port TP are open as in FIGURE 6, the previously introduced gaseous fuel mixture, which has been slightly compressed as the pistons move from the position of FIGURE 5 that of FIGURE 6, communicates by way of the exposed openings of the transfer port into the combustion chamber C.

As the gaseous fuel mixture is introduced into the combustion chamber scavenging of the exhaust gases takes place prior to the covering up of the outermost opening to the transfer ports and the closing of the exhaust ports EP.

Figure 7:
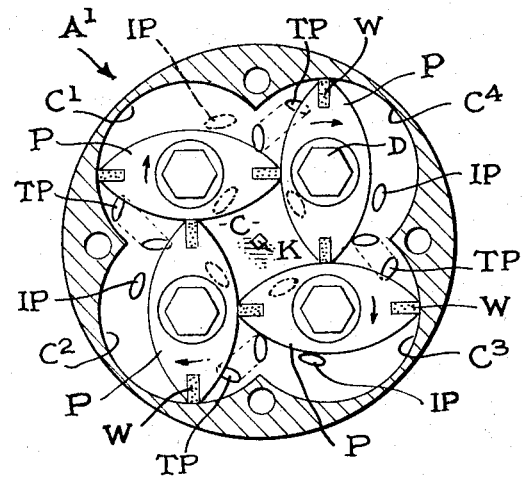
FIGURE 7 is a view similar to FIGURES 4, 5 and 6, but illustrating the inner chamber part-way through its compression stroke and the outer chambers proceeding half-way on the intake stroke.

As the pistons rotate from the position shown in FIGURE 6 to that shown in FIGURE 7 it will be seen that the combustion chamber C is progressively compressed and continues to the position shown in FIGURE 4, which latter movement serves to provide the final compression, making the cycle ready for the next firing stroke.

I claim:

1. In an internal combustion engine the combination, including, a power section having a cluster of circular piston chambers therein formed by overlapping circles struck from equidistant axes, intake ports in said section communicating with each said chamber, power transmitting shafts having their axes coinciding with the aforesaid equidistant axes of said piston chambers and each having an upper portion disposed in a related chamber and its lower portion disposed through the bottom of the section and provided with with gears meshing with a main output shaft for driving and synchronizing, an elliptical cam piston mounted on each of said shafts in each of said chambers, said cam pistons having their opposite outer end portions of a length equal to the diameter of each circular chamber, and said cam pistons each maintaining constant contact with the next adjacent cam piston, whereby, an enclosed and expansible combustion chamber is formed about the center axis of said power section.

2. An internal combustion engine according to claim 1, wherein, the major axis of each elliptical cam piston is fixed at right angles to the major axis of the adjacent piston.

3. An internal combustion engine according to claim 1, wherein, four of said cam pistons are provided, and the major axes of each pair of diametrically opposed pistons are at all times parallel.

4. An internal combustion engine according to claim 1, wherein, the ends of each cam piston are provided with sealing means, each said sealing means alternately engaging the wall of the adjacent said piston chamber and the adjacent pistons.

5. An internal combustion engine according to claim 4, including a peg disposed in the center of the combustion chamber and having a height less than the height of said pistons.

6. An internal combustion engine according to claim 1, including an exhaust port adjacent each said piston and all adapted to communicate with said combustion chamber when said pistons are disposed in one position.

7. An internal combustion engine according to claim 1, including a transfer port in said section for each said piston, each said transfer port comprising a passageway having two openings alternately covered and exposed by said pistons during rotation thereof.

8. An internal combustion engine according to claim 7, wherein, said transfer ports are disposed so that when the ends of each piston are juxtaposed the ends of each adjacent piston one opening of each transfer port is exposed on one side of each piston while the other opening of each transfer port communicates with said combustion chamber.

References Cited

UNITED STATES PATENTS

| 1,656,538 | 1/1928 | Smith | 123—12 |
| 2,097,881 | 11/1937 | Hopkins | 123—12 |
| 3,174,274 | 3/1965 | Frye | 123—12 XR |
| 3,315,653 | 4/1967 | Chicurel | 123—8 XR |

FOREIGN PATENTS

| 1,128,173 | 8/1956 | France. |
| 1,320,991 | 2/1963 | France. |

WENDELL E. BURNS, Primary Examiner.

U.S Cl. X.R.

103—126; 123—13, 16